(12) United States Patent
Krishnaswami et al.

(10) Patent No.: US 9,836,949 B2
(45) Date of Patent: Dec. 5, 2017

(54) GENERATING RECOMMENDED MAINTENANCE STEPS FOR INDUSTRIAL MACHINES BASED ON HISTORICAL INTERACTION DATA WITH A MOBILE APPLICATION

(71) Applicant: Waygum, Inc., Dublin, CA (US)

(72) Inventors: Gnanasundar Krishnaswami, Dublin, CA (US); Prashanth Adiraju, Campbell, CA (US)

(73) Assignee: WAYGUM, INC., Dublin, CA (US)

( * ) Notice: Subject to any disclaimer, the term of this patent is extended or adjusted under 35 U.S.C. 154(b) by 0 days.

(21) Appl. No.: 15/050,320

(22) Filed: Feb. 22, 2016

(65) Prior Publication Data

US 2017/0243466 A1    Aug. 24, 2017

(51) Int. Cl.
  *G08B 21/00*    (2006.01)
  *G08B 21/24*    (2006.01)
  *G08B 5/22*    (2006.01)

(52) U.S. Cl.
  CPC .............. *G08B 21/24* (2013.01); *G08B 5/222* (2013.01)

(58) Field of Classification Search
  CPC ... B60W 2050/146; B60W 50/14; B61K 9/08; B61L 23/042; B61L 27/0055; B61L 27/0088; G05B 19/418; G05B 23/024; G05B 23/0245; G05B 23/0278; G06F 17/5009; G06F 11/3034; G06F 11/3438; G06F 17/30289

USPC ........ 340/679, 870.01, 648, 870.17, 870.07, 340/870.05, 584, 590, 586, 593
  See application file for complete search history.

(56) References Cited

U.S. PATENT DOCUMENTS

| | | | | |
|---|---|---|---|---|
| 5,917,428 A | * | 6/1999 | Discenzo | G01R 31/343 307/116 |
| 8,717,851 B1 | * | 5/2014 | Nurse | A61J 7/0481 368/10 |
| 2008/0228314 A1 | * | 9/2008 | Sjostrand | G05B 23/0283 700/175 |
| 2008/0282113 A1 | * | 11/2008 | Yuuki | G06F 11/0727 714/45 |
| 2012/0271504 A1 | * | 10/2012 | Reiners | E02F 9/2054 701/29.1 |
| 2013/0282151 A1 | * | 10/2013 | Timsjo | G02B 27/0093 700/80 |

* cited by examiner

*Primary Examiner* — Daniel Previl
(74) *Attorney, Agent, or Firm* — Polsinelli PC

(57) ABSTRACT

A Worker Machine Interaction Intelligence System (WMIIS) can receive performance data describing performance of a first industrial machine, determine, based on the performance data, that at least a first alert condition for the first industrial machine has been triggered, and identify a first designated user to notify about the first alert condition having been triggered by the first industrial machine. The WMIIS can identify a set of recommended maintenance steps to be performed by the first designated user in response to the first alert condition being triggered and transmit, to a client device of the first designated user: an alert message notifying the first designated user that the first alert condition has been triggered by the first industrial machine, and the first set of recommended maintenance steps.

20 Claims, 6 Drawing Sheets

FIG. 4

GENERATING RECOMMENDED MAINTENANCE STEPS FOR INDUSTRIAL MACHINES BASED ON HISTORICAL INTERACTION DATA WITH A MOBILE APPLICATION

TECHNICAL FIELD

The present technology pertains to industrial machines, and more specifically pertains to generating a set of recommended maintenance steps for industrial machines based on historical interaction data with a mobile application.

BACKGROUND

Industrial workers are tasked with managing complex industrial machines. While organizations can gather data internally to prepare recommended procedures, the data collected is limited to the industrial workers and industrial machines available to the organization. The resulting recommended procedures are static and often general, without taking into consideration the specific circumstances, such as specific performance condition of the industrial machine, the skill level of the industrial workers that prepared the recommended procedures or the skill level of the industrial workers that will use the recommended procedures. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating a set of recommended maintenance steps for an industrial machine based on historical interaction data gathered from a mobile application. In some embodiments of the present technology, a Worker Machine Interaction Intelligence System (WMIIS) can receive, from a first industrial machine, performance data describing performance of the first industrial machine, determine, based on the performance data, that at least a first alert condition for the first industrial machine has been triggered, and identify a first designated user to notify about the first alert condition having been triggered by the first industrial machine. The WMIIS can identify, from a plurality of sets of recommended maintenance steps, a first set of recommended maintenance steps to be performed by the first designated user in response to the first alert condition being triggered, the first set of recommended maintenance steps having been generated based on interaction data gathered from a plurality of user devices that include a mobile application used to interact with industrial machines, the interaction data indicating interactions with the mobile application made by a plurality of users in response to same or similar alert conditions as the first alert condition being triggered by same or similar industrial machines as the first industrial machine, and transmit, to a client device of the first designated user: an alert message notifying the first designated user that the first alert condition has been triggered by the first industrial machine, and the first set of recommended maintenance steps.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 shows an example of an alert message;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for generating a set of recommended maintenance steps for an industrial machine based on historical interaction data with a mobile application. In some embodiments of the present technology, an WMIIS can receive, from a first industrial machine, performance data describing performance of the first industrial machine, determine, based on the performance data, that at least a first alert condition for the first industrial machine has been triggered, and identify a first designated user to notify about the first alert condition having been triggered by the first industrial machine. The WMIIS can identify, from a plurality of sets of recommended maintenance steps, a first set of recommended maintenance steps to be performed by the first designated user in response to the first alert condition being triggered, the first set of recommended maintenance steps having been generated based on interaction data gathered from a plurality of user devices that include a mobile application used to interact with industrial machines, the interaction data indicating interactions with the mobile application made by a plurality of users in response to same or similar alert conditions as the first alert condition being triggered by same or similar industrial machines as the first industrial machine, and transmit, to a client device of the first designated user: an alert message notifying the first designated user that the first alert condition has been triggered by the first industrial machine, and the first set of recommended maintenance steps.

Figure 1:
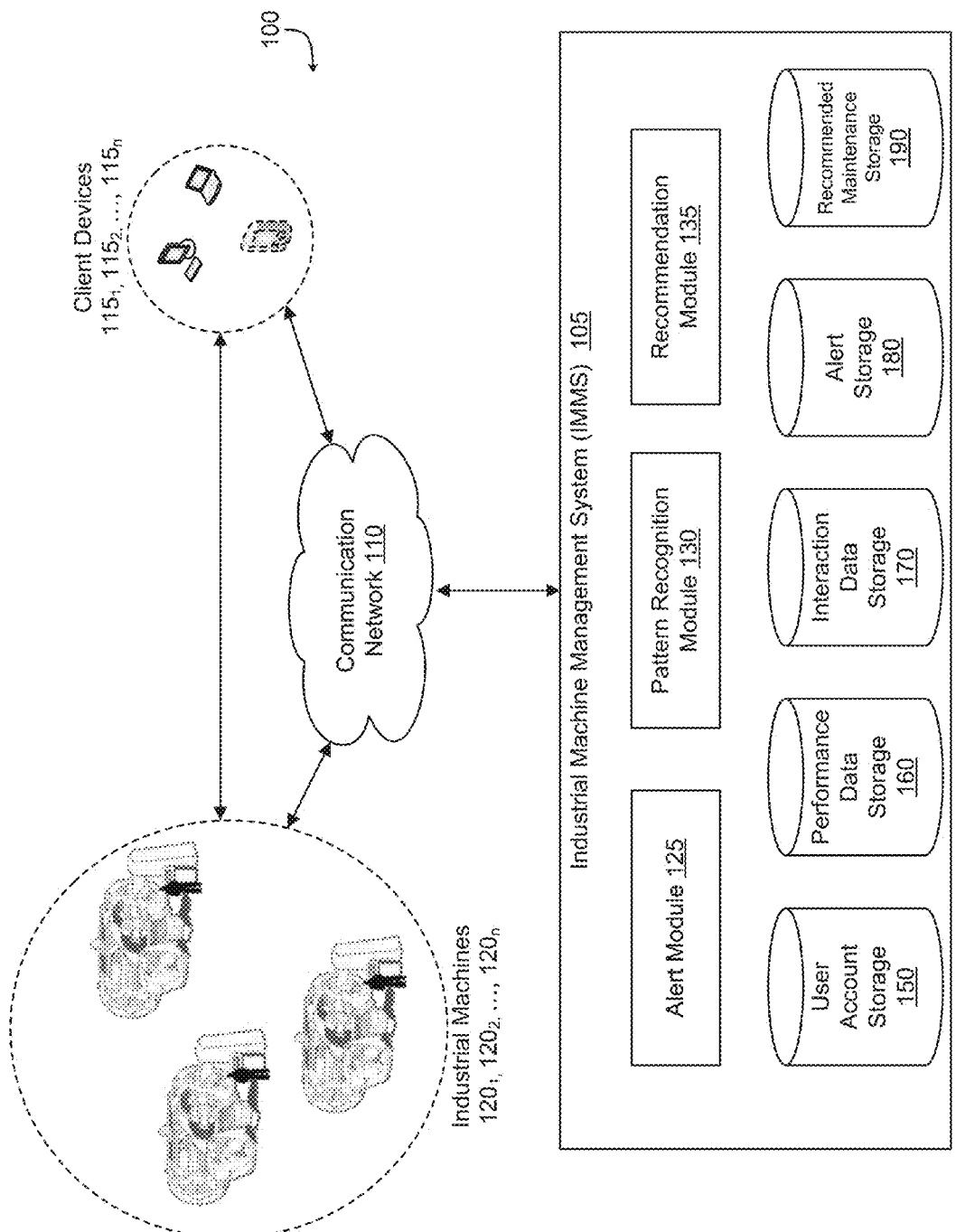
FIG. 1 shows an exemplary configuration of devices and a network in accordance with the invention.

FIG. 1 shows an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 600 of FIGS. 6A and 6B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, in system 100, industrial machines $120_1$, $120_2$, ..., $120_n$ (collectively "120"), client devices $115_1$, $115_2$, ..., $115_n$ (collectively "115") and Worker Machine Interaction Intelligence System (WMIIS) 105 can communicate with each other via communication network 110 to transfer and receive data. Industrial machines 120 can be any type of industrial machine that is equipped with one or more sensors configured to gather performance data from an industrial machine 120 and transmit the performance data to one or more computing devices in network communication with the industrial machine 120. Examples of industrial machines 120 can include agricultural equipment, industrial robots, oil refinery machinery, packaging machinery, boilers, etc. Performance data can include any type of data that can be gathered from an industrial machine 120 by a sensor that describes the performance of the industrial machine 120. Examples of performance data can include temperature value, pressure value, humidity value, operating power value, operating state, etc.

Client devices 115 can be any type mobile computing device of varying type, capabilities, operating systems, etc. Examples of client device can include a smart phone, tablet PC, laptop, etc. Client devices 115 can include an Industrial Machine Mobile Application (IMMA) configured to enable a client device 115 to communicate with industrial machines 120 to send and receive data. For example, the IMMA can be a client side application that allows a user to initiate communication with an industrial machine 120 via communication network 110 or, alternatively, directly using a communication protocol such as BLUETOOTH®. The IMMA can further enable a user to cause the industrial machine 120 to perform specified actions. For example, a user can interact with the IMMA installed on a client device 115 to cause the client device 115 to transmit specified commands to an industrial machine 120. The specified command can cause the industrial machine 120 to perform desired actions. Examples of desired actions can include returning specified data (e.g., performance data, configuration data, preference data), rebooting the industrial machine 120 or a portion of the industrial machine 120, modifying settings and/or preferences for the industrial machine 120, etc.

Use of an IMMA to communicate with and manage industrial machines provides several advantages over traditional desktop computing applications. For example, use of an IMMA allows a greater number of industrial workers and workers with a broader skill level to be equipped to manage industrial machines. Accordingly, use of an IMMA can result in much more and much richer interaction data being collected. For example, mobile devices are equipped to take pictures, videos, send messages, determine a current location, etc.

WMIIS 105 can be a computing system comprising of one or more computing devices configured to monitor industrial machines 120, determine if alert conditions have been triggered, alert designated users and generate and provide recommended maintenance steps for designated users. WMIIS 105 can support and concurrently accept connections from a variety of different types of client devices 115 and industrial machines 120.

WMIIS 105 can be configured to receive and store data received from industrial machines 120. For example, WMIIS 105 can receive performance data from industrial machines 120. Performance data can include any type of data that can be gathered from an industrial machine 120 by a sensor of an industrial machine 120 that describes the performance of the industrial machine 120.

WMIIS 105 can include performance data storage 160 configured to store performance data and WMIIS 105 can be configured to store performance data received from industrial machines 120 in performance data storage 160. In addition to describing performance of an industrial machine 120, the performance data can also include other metadata describing the gathered performance data. For example, the performance data can include metadata describing the industrial machine 120 from which the performance data was received, such as a unique identifier identifying the specific industrial machine 120, data identifying the type of industrial machine 120, age of the industrial machine 120, geographic location of the industrial machine 120, organization that owns and/or maintains the industrial machine 120, time that the performance data was received, etc.

In some embodiments, WMIIS 105 can be configured to analyze the performance data to determine whether one or more alert conditions have been triggered. An alert condition can by a set of one or more conditions based on the performance data of an industrial machine 120 that, if and when met, cause WMIIS 105 to transmit an alert message to one or more designated users associated with the industrial machine 120. For example, an alert condition can be an industrial machine powering, a temperature rising above and/or below threshold temperature values, etc.

Alert conditions can be standard and/or preconfigured alert conditions associated with an industrial machine 120 and/or set by an industrial worker, administrator or other user associated with the industrial machine 120. WMIIS 105 can include alert storage 180 configured to store alert conditions for multiple industrial machines 120. The alert conditions associated in alert storage 180 can be associated with their corresponding industrial machines 120. For example, the alert conditions can be associated with unique identifiers identifying their corresponding industrial machines 120.

WMIIS 105 can include alert module 125 configured to monitor performance data received from industrial machines 120 and determine whether any alert conditions corresponding to the industrial machines 120 have been triggered. For example, alert module 125 can check whether a current temperature value of an industrial machine 120 meets or exceeds a threshold temperature value specified by the alert conditions associated with the industrial machine 120. If alert module 125 determines that the current temperature does meet or exceed the threshold temperature value, the alert module 125 can determine that the alert condition has been triggered by the industrial machine.

Alert module 125 can further be configured to alert one or more specified users that an alert condition has been triggered. For example, alert module 125 can transmit an alert message to a client device 115 of a specified user that notifies the specified user that the alert condition has been triggered by the industrial machine. The alert message can include metadata describing the alert condition being triggered, such as data identifying the specified industrial machine 120 that triggered the alert condition, data describing the specified alert condition (e.g, a threshold value or performance that was met) the performance data that triggered the alert condition, the time the alert condition was met, historical performance data associated with the industrial machine 120, etc.

A specified user can be a user designated to receive an alert message when an alert condition has been triggered by an industrial machine 120. For example, a specified user can be an industrial worker, administrator or other user tasked with maintaining the industrial machine 120. In some embodiments, alert storage 180 can maintain data identifying the designated user(s) that should be notified when an alert condition is triggered. For example, alert storage 180 can maintain contact information associated with client devices 115 of the designated users and alert module 125 can use the contact information to transmit an alert message to the designated user.

Alternatively, alert storage 180 can maintain an account identifier for a user account associated with the specified user. WMIIS 105 can include user account storage 150 configured to maintain a user account for multiple users. A user account can include data associated with the corresponding user, such as contact information for the user, profile data for the user (e.g., title, designated experience level, etc.), work history data associated with the user, etc. Alert module 125 can use an account identifier to communicate with user account storage 150 to identify the corresponding user account and gather contact information for the specified user. Alert module 125 can use the gathered contact information to transmit an alert message to the specified user.

In some embodiments, alert module 125 can select a designated user to receive an alert message based on the current location of the users. For example, alert module 125 can gather location information stored in account storage 150 or, alternatively, request location information from the client devices 115 of the users. Alert module 125 can use the location information to identify the designated user closest to the industrial machine 120, or alternatively, the designated users within a predetermined threshold distance of the industrial machine 120, and send alert messages to one or more of the identified designated users.

WMIIS 105 can also be configured to generate sets of recommended maintenance steps to be performed in response to an alert condition being triggered and provide a set of recommended maintenance steps to a specified user along with an alert message. A set of recommended maintenance steps can be a set of one or more recommended interactions for a user to perform with an IMMA in a specified order in response to an alert condition being triggered by an industrial machine 120. For example, the set of recommended maintenance steps can instruct a specified user to use an IMMA to first attempt to reboot the industrial machine 120, followed by a number of other additional steps in the first step does not rectify the problem.

WMIIS 105 can generate the sets of recommended maintenance steps based on interaction data gathered from client devices 115. Interaction data can be any data describing user interactions with an IMMA on a client device to communicate with an industrial machine 120. Examples of interaction data can include data indicating that specified user interface elements were selected, specified actions were taken, commands were entered, data requested, notes taken, pictures taken, video taken, Global Positioning System (GPS) coordinates, etc. Client devices 105 can be configured to continuously or periodically transmit interaction data to WMIIS 105 as interactions are performed by users of the client devices 105.

WMIIS 105 can include interaction data storage 170 configured to maintain interaction data received from client devices 105 and WMIIS 105 can store the interaction data received from client devices 115 in interaction data storage 170. The stored interaction data can also include additional metadata describing the interaction data, such as a time the interaction data was received, the specific industrial machine 120 associated with the interaction data, the type of industrial machine 120, the specific user that performed the interactions, a skill level of the user, an alert condition that was triggered by the industrial machine 120, performance data gathered from the industrial machine 120, etc.

WMIIS 105 can include pattern recognition module 130 configured to analyze the interaction data to generate sets of recommended maintenance steps. Pattern recognition module 130 can be configured to communicate with any of interaction data storage 170, performance data storage 160, user account storage and alert storage 180 to recognize patterns of interactions taken by users in response to specified alert conditions being triggered and/or specified performance data. For example, the pattern recognition module 130 can gather interaction data performed by a plurality of user after similar or same alert conditions were triggered by similar or same industrial machines. Similar or same alert conditions can include alert conditions associated with a same sensor on an industrial machine, such as a specified heat sensor. As another example, similar or same alert conditions can include alert conditions that have similar threshold values or performance that must be met for the alert condition to be triggered. Similar or same industrial machines 120 can be determined based on the type of industrial machines, the function of the industrial machines, a model number, year built, etc.

Pattern recognition module 130 can analyze the gathered interaction data to identify patterns in the interactions that were taken by user. This can include identifying patterns of interactions that were commonly taken that led to resolve a problem with the industrial machine 120 and/or return the industrial machine 120 to desired operating condition. For example, pattern recognition module 130 can identify patterns of interactions taken by users in response to a threshold temperature being exceeded that led to the temperature of the industrial machine to fall below the threshold temperature. Additionally, pattern recognition module 130 can further identify patterns of interactions taken by users that did not result in resolution of a problem with the industrial machine 120 and/or returning the industrial machine 120 to operating conditions.

Pattern recognition module 130 can use these identified patterns to generate sets of recommended maintenance steps that can be taken to resolve the problem with the industrial machine 120 and/or return the industrial machine 120 to desired operating condition. For example, pattern recognition module 130 can identify the minimal number steps that were commonly performed that resulted in resolution of the issue and assign these steps as the recommended maintenance steps. Alternatively, pattern recognition module 130 can identify the steps that were most commonly performed that resulted in resolution of the issue and assign these steps as the recommended maintenance steps. As another example pattern recognition module 130 can identify patterns of steps that were taken by at least a threshold number or threshold percentage of users to resolve the issue and assign these steps as the recommended maintenance steps.

Additionally, pattern recognition module 130 can analyze steps that were commonly taken that did not result in resolution of the issue. For example, pattern recognition module 130 can remove or exclude steps from the recommended maintenance steps that were commonly or uniquely taken by users and did not result in resolution of the issue.

In some embodiments, pattern recognition module 130 can analyze and consider the skill level of the users that performed the interactions. For example, pattern recognition module 130 can provide greater weight to interactions taken by users that have overall greater skill level or greater skill level with a specified machine or machine type, than those users that have a lower skill level or experience level. As another example, pattern recognition module 130 can provide greater weight to interactions taken by users that have more experience with a specified type of alert condition or issue, and less weight to interactions taken by users with less experience with a specified alert condition or issue.

WMIIS 105 can include recommended maintenance storage 190 configured to store sets of recommended maintenance steps and pattern recognition module 130 can be configured to store the generated sets of recommended maintenance steps in recommended maintenance storage 190. Additionally, pattern recognition module 130 can communicate with recommended maintenance storage 190 to periodically edit or update the sets of recommended maintenance steps. For example, pattern recognition module 130 can be configured to regenerate or update the sets of recommended maintenance steps on a regular schedule and/or in response to a threshold amount of new interaction data being received from client devices 115.

The sets of recommended maintenance steps can be stored with additional metadata describing the sets of recommended maintenance steps. For example, the metadata can include data describing an alert condition, industrial machine, industrial machine type, user skill level, etc., associated with the set of recommended maintenance steps. Additionally, the sets of recommended maintenance steps can include other interaction data that may assist a designated user respond to an alert message. For example, the sets of recommended maintenance steps can include photos, videos, notes, message, etc., that may be helpful to user when responding to an alert message. This can include photos, videos, etc., that were prepared for providing assistance as well as those captured by other industrial workers when dealing with the same or similar alert conditions.

WMIIS 105 can further include recommendation module 135 configured to identify an appropriate set of recommended maintenance steps to provide to a designated user in an alert message. For example, alert module 125 can be configured to notify recommendation module 135 that an alert condition has been triggered and request that recommendation module 135 select a set of recommended maintenance steps to provide to the specified user. The alert module 125 can provide recommendation module with data needed to select the set of recommended maintenance steps, such as data identifying the specified user, the triggered alert condition, the type of industrial machine 120, the exact industrial machine 120, etc.

Recommendation module 135 can use the received data to select an appropriate set of recommended maintenance instructions to provide to the user. For example, recommendation module 135 can search recommended maintenance storage 190 for a set of set of recommended maintenance steps for similar or same alert conditions triggered by similar or same industrial machines 120.

In some embodiments, recommendation module 135 can determined a skill level of the specified user and select a set of recommended maintenance steps based on the determined skill level. For example, recommendation module 135 can communication with user account storage 150 to access the specified user's account and gather profile data describing the user's overall skill level, skill level with the specified alert condition or issue, skill level with the industrial machine type and/or skill level with the specified industrial machine 120. Recommendation module 135 can then select a set of recommended maintenance steps that best suits the specified user based on the user's specified skill level.

Recommendation module 135 can then provide the selected set of recommended maintenance steps to alert module 125. Alert module 125 can include the set of recommended maintenance steps in the alert message transmitted to the specified user's client device.

Figure 2:
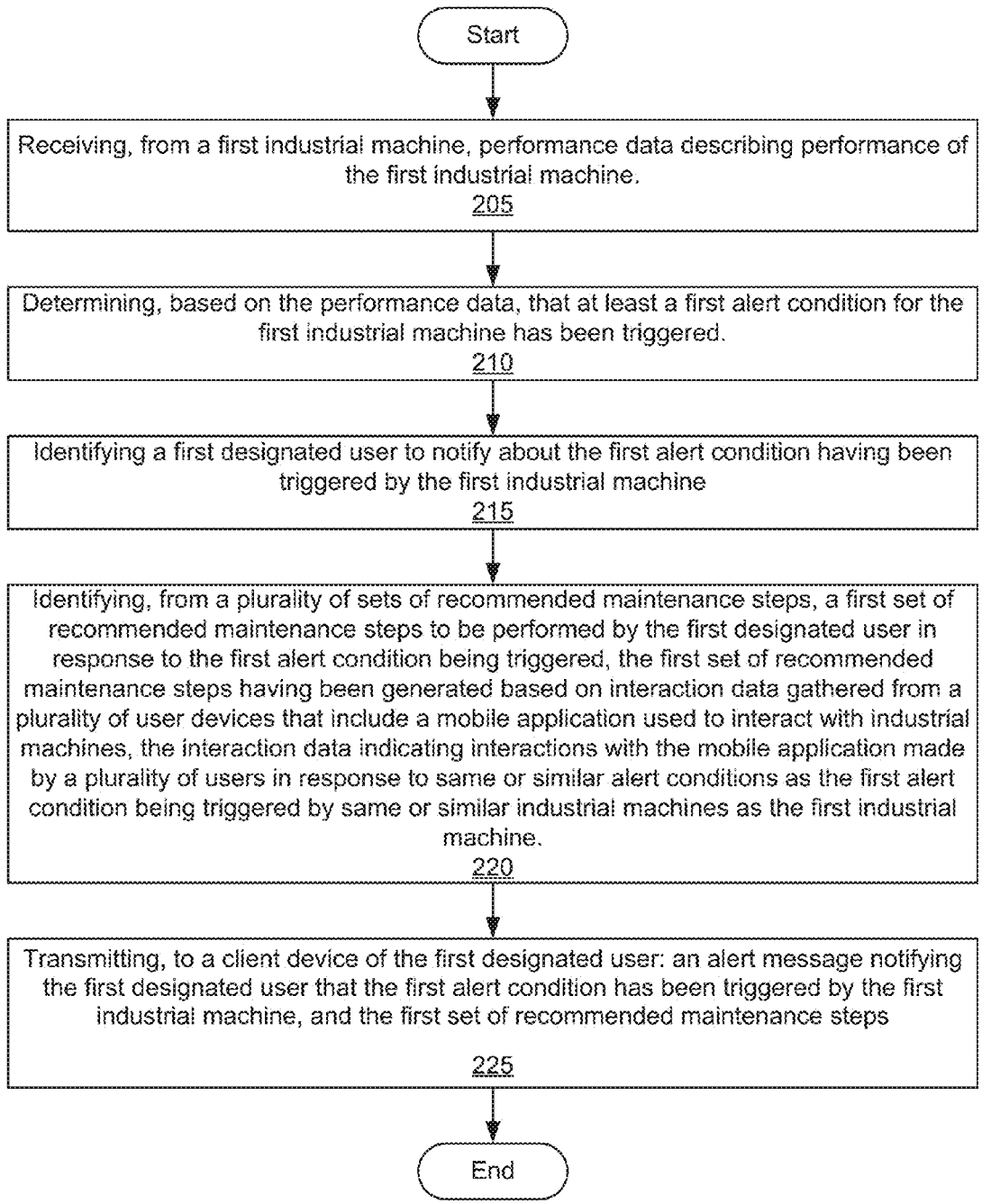
FIG. 2 shows an example method in accordance with the invention.

Having disclosed some basic system components and concepts, the disclosure now turns to the example method shown in FIG. 2. For the sake of clarity, the method is described in terms of system 100, as shown in FIG. 1, configured to practice the method. The steps outlined herein are example and can be implemented in any combination thereof, including combinations that exclude, add, or modify certain steps.

At block 205, an WMIIS can receive, from a first industrial machine, performance data describing performance of the first industrial machine. The performance data can be any type of data describing performance of the industrial machine. For example, the performance data can be gathered by one or more sensors of the industrial machine and describe current states of the machine, such as a current temperature, data usage, etc.

At block 210, the WMIIS can determine, based on the performance data, that at least a first alert condition for the first industrial machine has been triggered. An alert condition can be one or more conditions that, if met, cause the alert condition to be triggered. For example, an alert condition can be a threshold value that if met or exceeded, cause the alert condition to be triggered. As another example, an alert condition can be triggered if an industrial machine enters a specified state, such as shutdown or offline. The WMIIS can analyze the performance data to determine whether an alert condition has been triggered.

At block 215, the WMIIS can identify a first designated user to notify about the first alert condition having been triggered by the first industrial machine. A designated user can be an industrial worker, administrator or other user tasked with managing or maintaining the industrial machine.

At block 220, the WMIIS can identify, from a plurality of sets of recommended maintenance steps, a first set of recommended maintenance steps to be performed by the first designated user in response to the first alert condition being triggered. The first set of recommended maintenance steps can have been generated based on interaction data gathered from a plurality of user devices that include a mobile application used to interact with industrial machines and the interaction data can indicate interactions with the mobile application made by a plurality of users in response to same or similar alert conditions as the first alert condition being triggered by same or similar industrial machines as the first industrial machine. For example, the mobile application can be an IMMA that is configured to enable a client device to communicate with an industrial machine. A user can thus use the mobile application to request performance data, modify setting, instruct an industrial machine to perform specified actions, etc.

At block 225, the WMIIS can transmit, to a client device of the first designated user, an alert message notifying the first designated user that the first alert condition has been triggered by the first industrial machine. The alert message can also include the first set of recommended maintenance steps. The client device can present the set of recommended maintenance steps to the user. For example, the set of recommended maintenance steps can be presented to the user by the IMMA installed on the client device.

Figure 3:
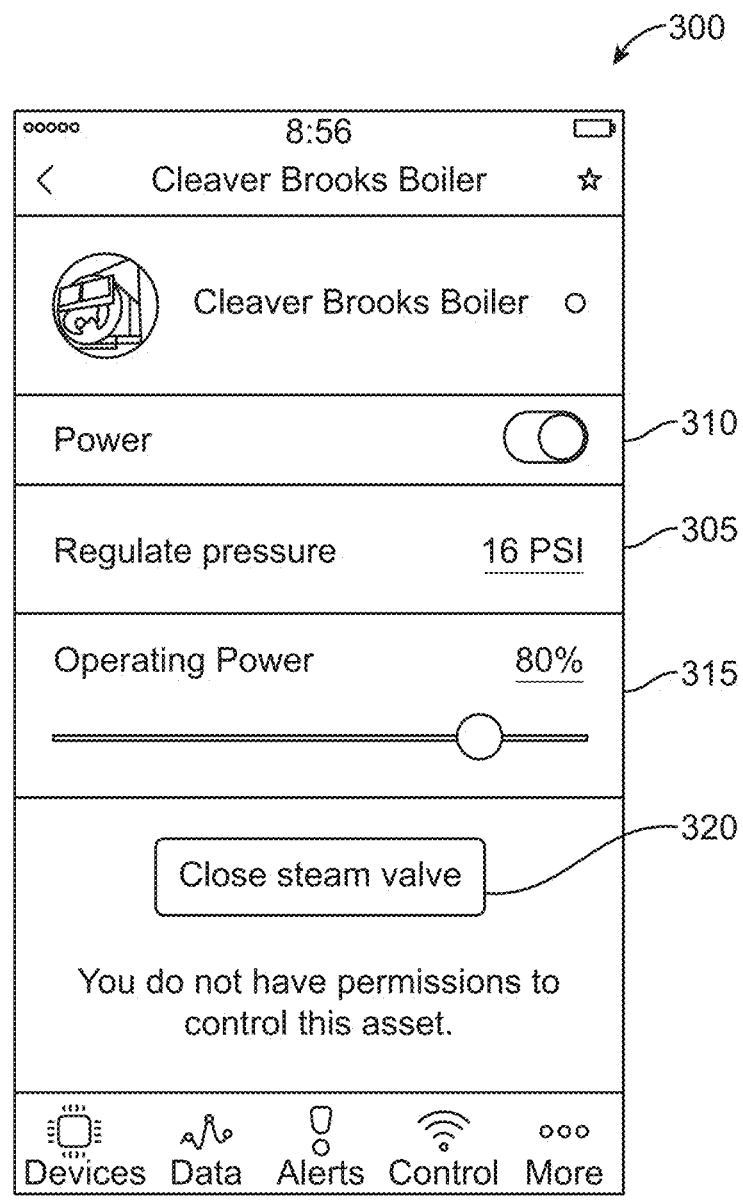
FIG. 3 shows an example user interface of an Industrial Machine Management Application (IMMA)

FIG. 3 shows an example user interface of an IMMA. As shown user interface 300 presents the user with performance data 305 indicating the current pressure of the industrial machine. User interface 300 further presents the user with user interface element 310 that allows a user to turn the power of the industrial machine on and off, and user interface element 315 that enables the user to adjust the operating power of the industrial machine. Finally, user interface 300 includes user interface element 320 that allows a user to close a steam valve of the industrial machine.

Figure 4:
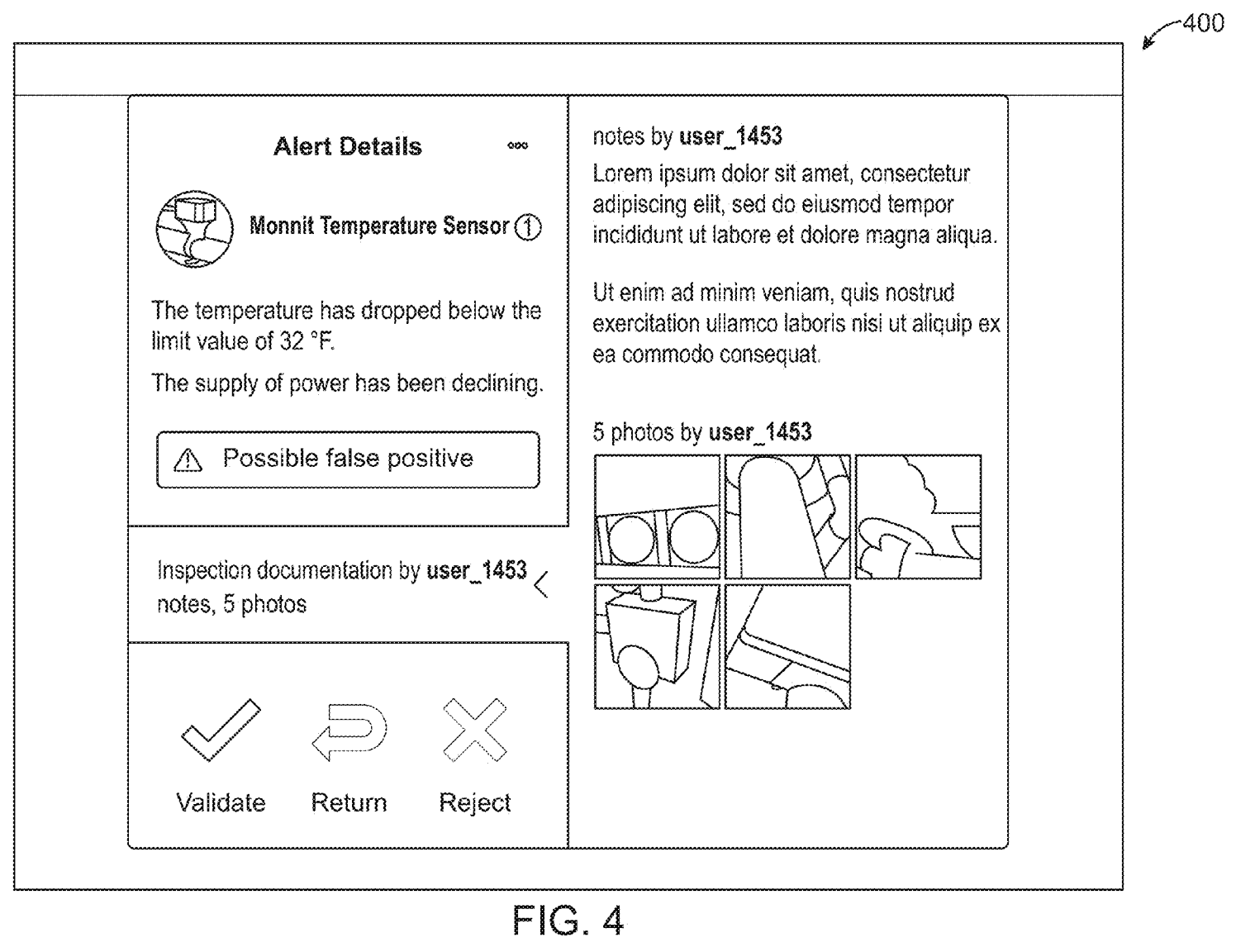

FIG. 4 shows an example of an alert message. As shown, alert message 400 notifies the user that an alert condition has been triggered. Specifically, alert message 400 notifies the user that the temperature value of the industrial machine has dropped below a threshold temperature value of 32 degrees.

Figure 5:
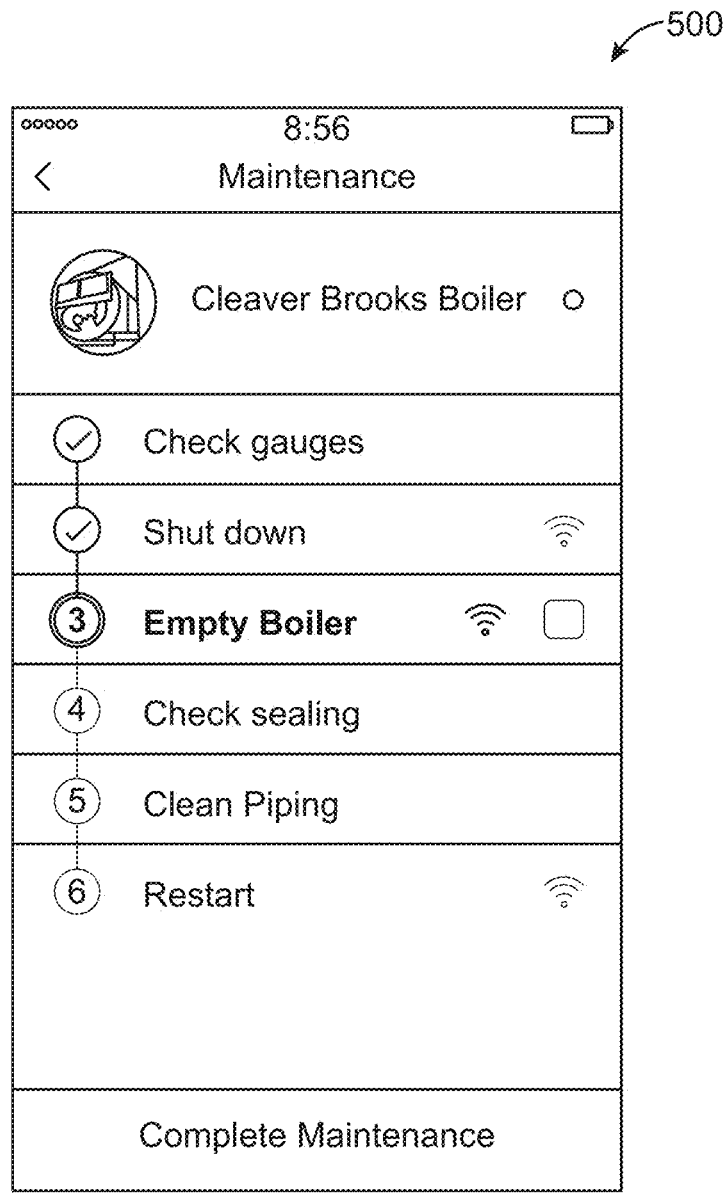
FIG. 5 shows an example set of recommended maintenance steps.

FIG. 5 shows an example set of recommended maintenance steps. As shown, the set of recommended maintenance steps 500 lists individual actions for a user to take in response to an alert condition being triggered. The set of recommended maintenance steps 500 further includes a specified order in which to perform the actions. For example the set of recommended maintenance steps recommend that a user first check gauges, shutdown the industrial machine, empty the boiler, check sealing, clean piping and final restart the industrial machine.

Figure 6A:
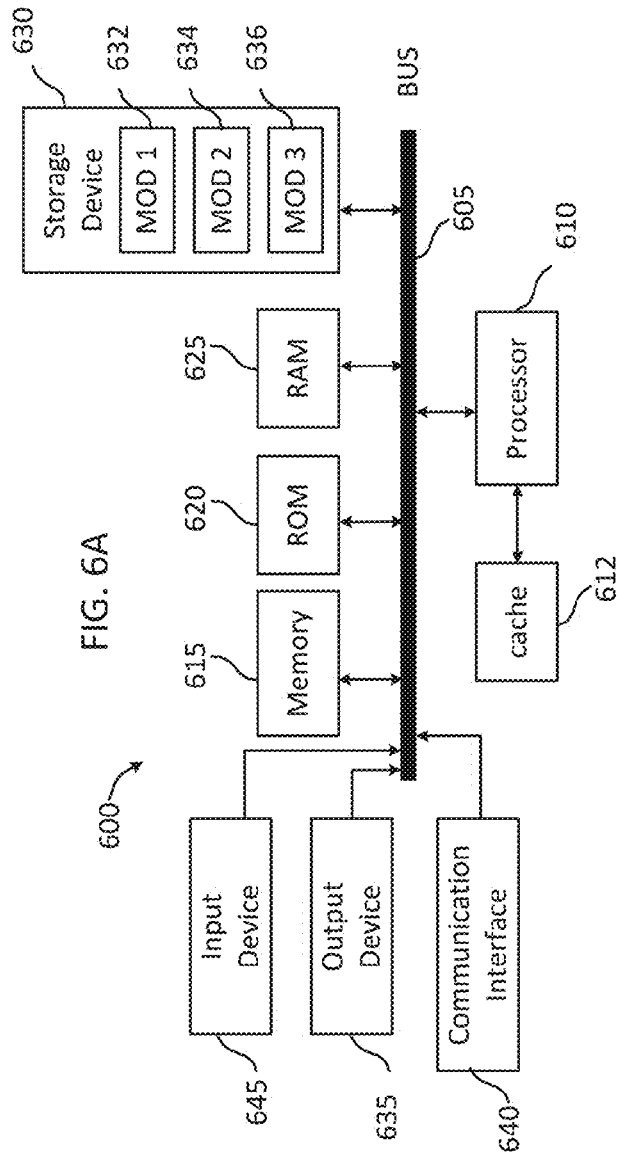
FIGS. 6A and 6B show exemplary possible system embodiments.
Figure 6B:
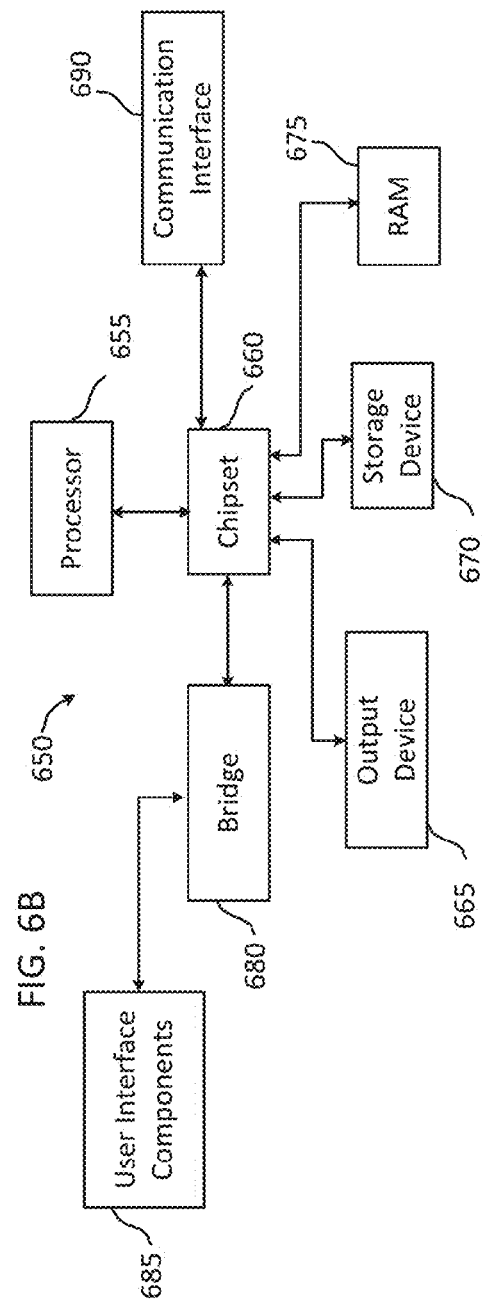

FIG. 6A, and FIG. 6B show exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving, from a first industrial machine, performance data describing performance of the first industrial machine;
   determining, based on the performance data, that at least a first alert condition for the first industrial machine has been triggered;
   identifying a first designated user to notify about the first alert condition having been triggered by the first industrial machine;
   identifying, from a plurality of sets of recommended maintenance steps, a first set of recommended maintenance steps to be performed by the first designated user in response to the first alert condition been triggered, the first set of recommended maintenance steps having been generated based on interaction data gathered from a plurality of user devices that include a mobile application used to interact with industrial machines, the interaction data indicating with the mobile application made by a plurality of users in response to same or similar alert conditions as the first alert condition being triggered by same or similar industrial machines as the first industrial machine; and
   transmitting, to a client device of the first designated user:
   an alert message notifying the first designated user that the first alert condition has been triggered by the first industrial machine, and
   the first set of recommended maintenance steps.

2. The method of claim 1, further comprising:
   receiving, from the plurality of user devices that include the mobile application used to interact with industrial machines, interaction data indicating interactions made by the plurality of users with the mobile application in response to alert conditions being triggered by industrial machines;
   identifying, based on the interaction data, patterns of steps performed by the plurality of users in response to similar or same alert conditions being triggered by similar of same industrial machines; and
   generating the plurality of sets of recommended maintenance steps based on the patterns.

3. The method of claim 2, wherein identifying the patterns of steps further comprises:

identifying, based on user profiles of the plurality of users, patterns of steps performed by steps that have similar or same skill level.

4. The method of claim 2, further comprising:
determining, based on a user profile of the first user, a skill level of the first user, wherein identifying the first set of recommended maintenance steps is based on the skill level of the first user.

5. The method of claim 4, wherein the skill level of the first user is determined based on the first user's experience with multiple types of industrial machines.

6. The method of claim 4, wherein the skill level of the first user is determined based on the first user's experience with industrial machines that are similar or same type as the first industrial machine.

7. The method of claim 1, wherein transmitting the first set of recommended maintenance steps to the client device causes the first of recommended maintenance steps to be presented on the client device by the mobile application.

8. A worker machine interaction intelligence system comprising:
one or more computer processors; and
a memory containing instructions that, when executed by the one or more computer processors, cause the worker machine interaction intelligence system to:
receive, from a first industrial machine, performance data describing performance of the first industrial machine;
determine, based on the performance data, that at least a first alert condition for the first industrial machine has been triggered;
identify a first designated user to notify about the first alert condition having been triggered by the first industrial machine;
identify, from a plurality of sets of recommended maintenance steps, a first set of recommended maintenance steps to be performed by the first designated user in response to the first alert condition being triggered, the first set of recommended maintenance steps having been generated based on interaction data gathered from a plurality of user devices that include a mobile application used to interact with industrial machines, the international data indicating interactions with the mobile application made by a plurality of users in response to same or similar alert conditions as the first alert condition being triggered by same or similar industrial machines as the first industrial machine; and
transmit, to a client device of the first designated user;
an alert message notifying the first designated user that the first alert condition has been triggered by the first industrial machine, and
the first set of recommended maintenance steps.

9. The worker machine interaction intelligence system of claim 8, wherein the instructions further cause the worker machine interaction intelligence system to:
receive, from the plurality of user devices that include the mobile application used to interact with industrial machines, interaction data indicating interactions made by the plurality of users with the mobile application in response to alert conditions being triggered by industrial machines;
identify, based on the interaction data, patterns of steps performed by the plurality of users in response to similar or same alert conditions being triggered by similar of same industrial machines; and
generate the plurality of sets of recommended maintenance steps based on the patterns.

10. The worker machine international intelligence system of claim 9, wherein identifying the patterns of steps further comprises:
identifying, based on user profiles of the plurality of users, patterns of steps performed by users that have similar or same skill level.

11. The worker machine interaction intelligence system of claim 9, wherein the instructions further cause the worker machine interaction intelligence system to:
determine, based on a user profile of the first user, a skill level of the first user, wherein identifying the first set of recommended maintenance steps is based on the skill level of the first user.

12. The worker machine interaction intelligence system of claim 11, wherein the skill level of the first user is determined based on the first user's experience with multiple types of industrial machines.

13. The worker machine interaction intelligence system of claim 11, wherein the skill level of the first user is determined based on the first user's experience with industrial machines that are a similar or same type as the first industrial machine.

14. The worker machine interaction intelligence system of claim 8, wherein transmitting the first set of recommended maintenance steps to the client device causes the first set of recommended maintenance steps to be presented on the client device by the mobile application.

15. An non-transitory computer-readable medium containing instructions that, when executed by the one or more computer processors of a worker machine interaction intelligence system, cause the worker machine interaction intelligence system to:
receive, from a first industrial machine, performance data describing performance of the first industrial machine;
determine, based on the performance data, that at least a first alert condition for the first industrial machine has been triggered;
identify a first designated user to notify about the first alert condition having been triggered by the first industrial machine;
identify, from a plurality of sets of recommended maintenance steps, a first set of recommended maintenance steps to be performed by the first designated user in response to the first user alert condition being triggered, the first set of recommended maintenance steps having been generated based on interaction data gathered from a plurality of user devices that include a mobile application used to interact with industrial machines, the interaction data indicating interactions with the mobile application made by a plurality of users in response to same or similar alert conditions as the first alert condition being triggered by same or similar industrial machines as the first industrial machine; and
transmit, to a client device of the first designated user:
an alert message notifying the first designated user that the first alert condition has been triggered by the first industrial machine, and
the first set of recommended maintenance steps.

16. The non-transitory computer-readable medium of claim 15, wherein the instructions further cause the worker machine interaction intelligence system to:
receive, from the plurality of user devices that include the mobile application used to interact with industrial machines, interaction data indicating interactions made by the plurality of users with the mobile application in response to alert conditions being triggered by industrial machines;

identify, based on the interaction data, patterns of steps performed by the plurality of users in response to similar or same alert conditions being triggered by similar of same industrial machines; and generate the plurality of sets of recommended maintenance steps based on the patterns.

17. The non-transitory computer-readable medium of claim 16, wherein identifying the patterns of steps further comprises:

identifying, based on user profiles of the plurality of users, patterns of steps performed by users that have similar or same skill level.

18. The non-transitory computer-readable medium of claim 16, wherein the instructions further cause the worker machine interaction intelligence system to:

determine, based on a user profile of the first user, a skill level of the first user, wherein identifying the first set of recommended maintenance steps is based on the skill level of the first user.

19. The non-transitory computer-readable medium of claim 18, wherein the skill level of the first user is determined based on the first user's experience with multiple types of industrial machines.

20. The non-transitory computer-readable medium of claim 18, wherein the skill level of the first user is determined based on the first user's experience with industrial machines that are a similar or same type as the first industrial machine.

\* \* \* \* \*